United States Patent
Neilan

(10) Patent No.: US 7,774,649 B2
(45) Date of Patent: Aug. 10, 2010

(54) SELF-SERVICE TERMINAL

(75) Inventor: Michael J. Neilan, Dundee (GB)

(73) Assignee: NCR Corporation, Duluth, GA (US)

( * ) Notice: Subject to any disclaimer, the term of this patent is extended or adjusted under 35 U.S.C. 154(b) by 369 days.

(21) Appl. No.: 12/012,166

(22) Filed: Jan. 31, 2008

(65) Prior Publication Data

US 2009/0199050 A1    Aug. 6, 2009

(51) Int. Cl.
*G06F 11/00*  (2006.01)
(52) U.S. Cl. .......................... 714/23; 714/22
(58) Field of Classification Search ............ 714/22, 714/23
See application file for complete search history.

(56) References Cited

U.S. PATENT DOCUMENTS

| | | | | |
|---|---|---|---|---|
| 5,107,245 A | * | 4/1992 | Gesper et al. | 340/436 |
| 5,155,842 A | * | 10/1992 | Rubin | 714/22 |
| 5,836,819 A | * | 11/1998 | Ugawa | 463/30 |
| 5,968,189 A | * | 10/1999 | Desnoyers et al. | 714/47 |
| 6,172,428 B1 | * | 1/2001 | Jordan | 290/40 C |
| 6,345,331 B1 | * | 2/2002 | Fuente | 710/72 |
| 6,401,217 B1 | * | 6/2002 | Clark et al. | 714/20 |
| 7,017,062 B2 | * | 3/2006 | Poisner | 713/340 |
| 7,506,209 B2 | * | 3/2009 | Kawata | 714/36 |
| 7,549,084 B2 | * | 6/2009 | Higashijima et al. | 714/23 |
| 7,562,265 B2 | * | 7/2009 | Azevedo et al. | 714/55 |
| 7,581,137 B2 | * | 8/2009 | Okada et al. | 714/24 |
| 2002/0123966 A1 | | 9/2002 | Chu et al. | |
| 2003/0023956 A1 | * | 1/2003 | Dulberg et al. | 717/130 |

FOREIGN PATENT DOCUMENTS

| | | | |
|---|---|---|---|
| EP | 1 659 548 A | 5/2006 | |
| EP | 1 672 595 A | 6/2006 | |

* cited by examiner

*Primary Examiner*—Bryce P Bonzo

(57) ABSTRACT

A self-service terminal comprises a pc core and at least one module, which can be powered down independently of the pc core, the terminal has a control application and an agent arranged to monitor the fault state of the at least one module and cause a fault signal to be sent from the self-service terminal when the fault state of the at least one module is characteristic of a problem with the at least one module. The agent is arranged to determine if the module has been powered down; whereupon the fault signal is buffered until the module is powered up and a determination as to the fault state of the module is again made. The fault signal is only sent if the fault state still indicates there to be a problem with the at least one module.

15 Claims, 4 Drawing Sheets

SELF-SERVICE TERMINAL

TECHNICAL FIELD

The present invention relates to a self-service terminal (SST), such as an automated teller machine (ATM).

BACKGROUND

ATMs are public access terminals that provide users with a secure, reliable, and convenient source of cash and other financial transactions in an unattended environment.

An ATM typically comprises a paneled chassis housing a plurality of interconnected modules for performing user interface, transaction, and management functions for the ATM. Typical user interface modules include a display module, a keypad module, and a card reader module; typical transaction modules include a cash dispenser module, and a statement printer module; and typical management modules include a controller module, a communications module, and a journal printer module.

The ATM controller module has an ATM controller application program including software drivers for the modules in the ATM, and ATM controller software to manage:

(1) fault prediction and tolerance (state of health) for the ATM modules;

(2) secure communications between the controller module and other modules, and between the ATM and both a remote transaction authorization server and a remote state of health management system server;

(3) transaction flow, business logic, and presentation of information to an ATM user or an ATM server.

When an ATM device or module changes from a good working state to a problem state where attention is needed immediately or soon a Simple Network Management Protocol (SNMP) agent will send a message to a remote management system which monitors the state of health of the ATM. The signal is sent via the communications module, which is in turn controlled by the controller application. This level of fault/problem reporting is required for efficient management of the ATM. As part of this system each device or module sends sate of health information to the PC core. This is either done in response to a request from the core or automatically in response to an event, the latter utilizing SNMP traps.

However, when a device or module within an ATM is powered down independently of the PC Core the PC core and its software will still be fully operational. In such a planned and controlled activity, by either a maintenance service engineer or the controller application software, the management system will be flooded with false status messages from the ATM. This will cause the management system to erroneously display these messages as genuine faults and possible dispatch a service engineer if the faults appear to require such a response. This causes unnecessary communications between the ATM and the management system server, as well as problems with error logs and may be very costly and inconvenient to service companies if engineers are sent out erroneously.

It is among the objects of an embodiment of the present invention to obviate or mitigate one or more of the above disadvantages, or other disadvantages associated with prior art self-service terminals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect of the present invention there is provided a self-service terminal comprising a pc core and at least one module, which can be powered down independently of the pc core; the terminal having a control application and an agent arranged to monitor the fault state of the at least one module and cause a fault signal to be sent from the terminal when the fault state of the at least one module is characteristic of a problem with the at least one module, wherein the agent is arranged to determine if the module has been powered down, whereupon the fault signal is buffered until the module is powered up and a determination as to the fault state of the module is again made and the fault signal is only sent if the fault state is still characteristic of a problem with the at least one module.

Preferably, there is a plurality of modules and each module has an associated agent.

More preferably, the agent is an SNMP agent. Still more preferably an SNMP trap.

Preferably, the at least one module is selected from: a display module, a keypad module, a card reader module, a cash dispenser module, a statement printer module; a controller module, a communications module and a journal printer module.

Preferably, the fault signal is arranged for detection and decoding by a remote state of health monitoring facility.

In a preferred embodiment the self-service terminal is an automated teller machine (ATM).

In one embodiment the control application comprises a plurality of module driver agents, a plurality of module function request agents for requesting functions provided by a module, the module driver agents being operable to co-operate with an associated function request agent to provide module functions.

In one embodiment the driver agents are organized in a community of agents.

Preferably, the agent is arranged to determine if the at least one module has been powered down by ascertaining when the terminal is placed in a diagnostic mode; loss of power to the at least one module being classified as a power down when the terminal is in said diagnostic mode.

As referred to herein the term "powered down" is intended to mean an intentional power down or shut down of the module by the controller application or a field engineer or the like. It is intended to differentiate from an erroneous shut down of the module due to a problem or fault with the module.

According to a second aspect of the present invention there is provided a method of operating a self-service terminal self-service terminal comprising a pc core and at least one module, which can be powered down independently of the pc core; the terminal having a control application and an agent arranged to monitor the fault state of the at least one module and cause a fault signal to be sent from the self-service terminal when the fault state of the at least one module is characteristic of a problem with the at least one module; the method including: determining if the module has been powered down; if the module has been powered down buffering the fault signal; powering up the module; and determining the fault state of the module again; and sending a fault signal only if the fault state is still characteristic of a problem with the at least one module As referred to herein, an "agent" is a software entity comprising code, and optionally data, which can be used to perform one or more operations in a computing environment. An agent performs operations with some degree of independence and autonomy, and presents a consistent interface to other software entities, such as other agents.

Two agent arrangements are disclosed, however, these are in no way intended to be limiting to the scope of invention and are enclosed as possible explanatory embodiments only.

Preferably, separate health agents are provided which co-operate with driver and function agents. Health agents are operable to record state of health information, such as the state of sensors in a module. Preferably, the interface between agents is implemented by a broker agent.

In an alternative embodiment a single agent, associated with a specific module, will perform the roles of each of: the health agent, the driver agent and the function agent in the first embodiment; as will be described in detail below. Other arrangements of agents are conceivable.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
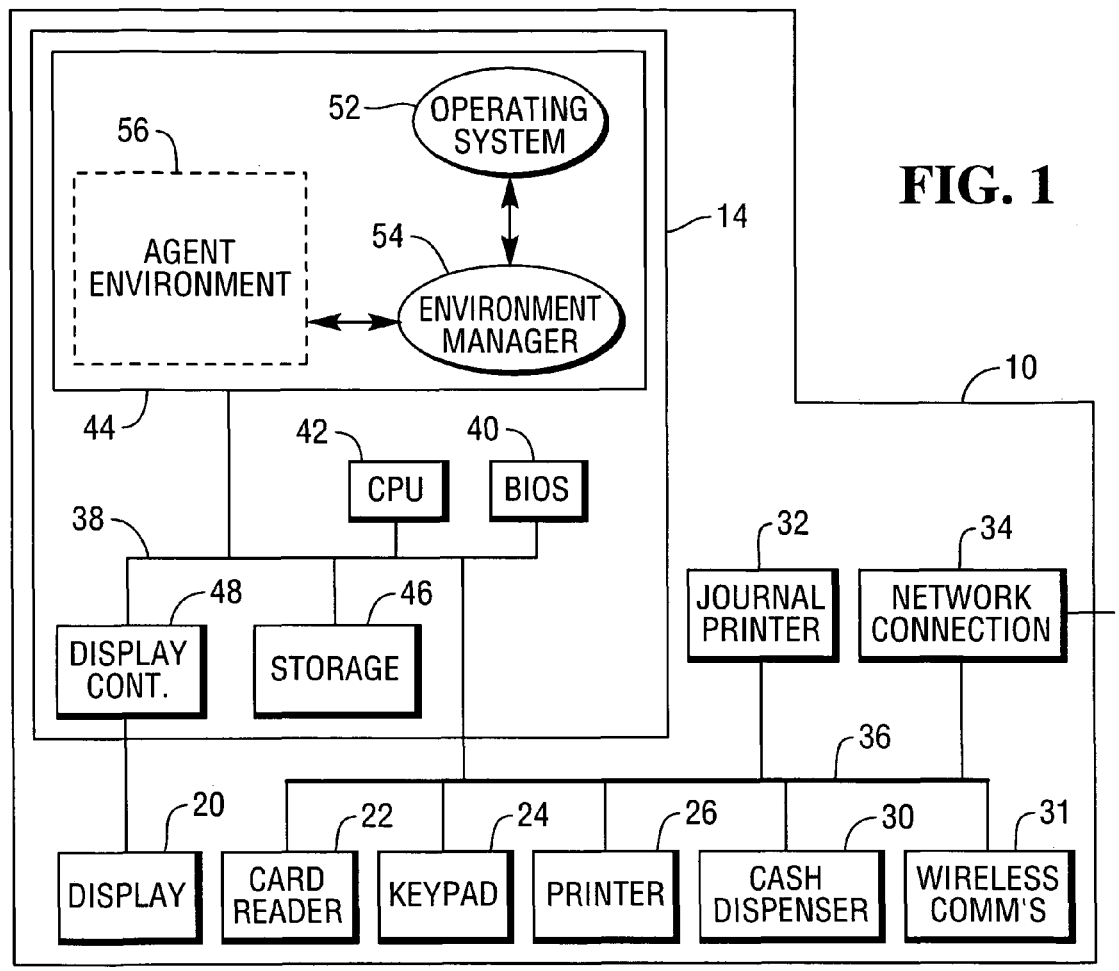
FIG. 1 is schematic diagram of the architecture of a self-service terminal in accordance with one embodiment of the present invention.
Figure 3:
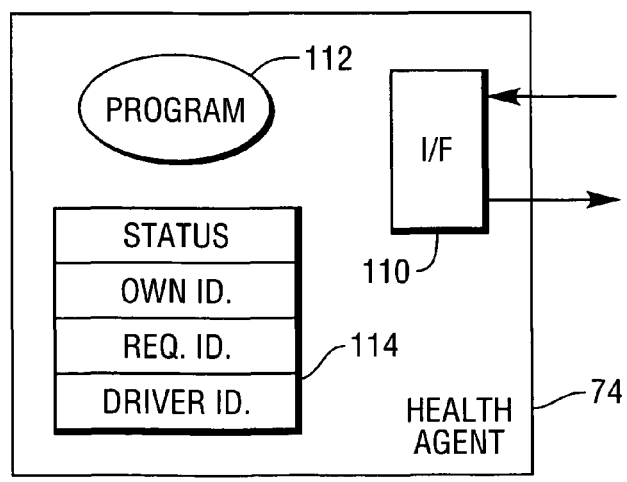
FIG. 3 is a schematic diagram of a health agent of the control application of FIG. 2.

Reference is first made to FIG. 1, which is a simplified block diagram of the architecture of an SST 10, in the form of an ATM.

The ATM 10 comprises a plurality of modules for enabling transactions to be executed and recorded by the ATM 10. These ATM modules comprise: a controller module 14, a display module 20, a card reader/writer module 22, an encrypting keypad module 24, a receipt printer module 26, a cash dispenser module 30, a wireless communication module 31 having a Bluetooth (trade mark) transceiver, a journal printer module 32 for creating a record of every transaction executed by the ATM 10, and a network connection module 34 (in the form of an enhanced network card) for accessing a remote authorization system (not shown) and a remote state of health management system (not shown).

The controller 14 comprises a BIOS 40 stored in non-volatile memory, a microprocessor 42, main memory 44, storage space 46 in the form of a magnetic disk drive, and a display controller 48 in the form of a graphics card.

The display module 20 is connected to the controller module 14 via the graphics card 48 installed in the controller module 14. The other ATM modules (22 to 34) are connected to the ATM controller 14 via a device bus 36 and one or more internal controller buses 38.

When the ATM is powered up, a secure booting-up process is performed, in which the main memory 44 is loaded with an ATM operating system kernel 52 and an agent environment manager 54 in a secure manner. Furthermore, the ATM modules (20 to 34) and other components within the controller module (40, 46, 48) are authenticated.

As is well known in the art, the operating system kernel 52 is responsible for memory management, process management, task management, and disk management. The agent manager 54 implements a Java Virtual Machine for allowing agents to execute within a controlled agent environment 56. A first embodiment of a feasible controlled agent environment 56 is illustrated in more detail in FIG. 2. A further embodiment is disclosed later in this document. Neither embodiment should be considered as limiting the scope of the invention as detailed in the acclaimed appended hereto.

Figure 2:
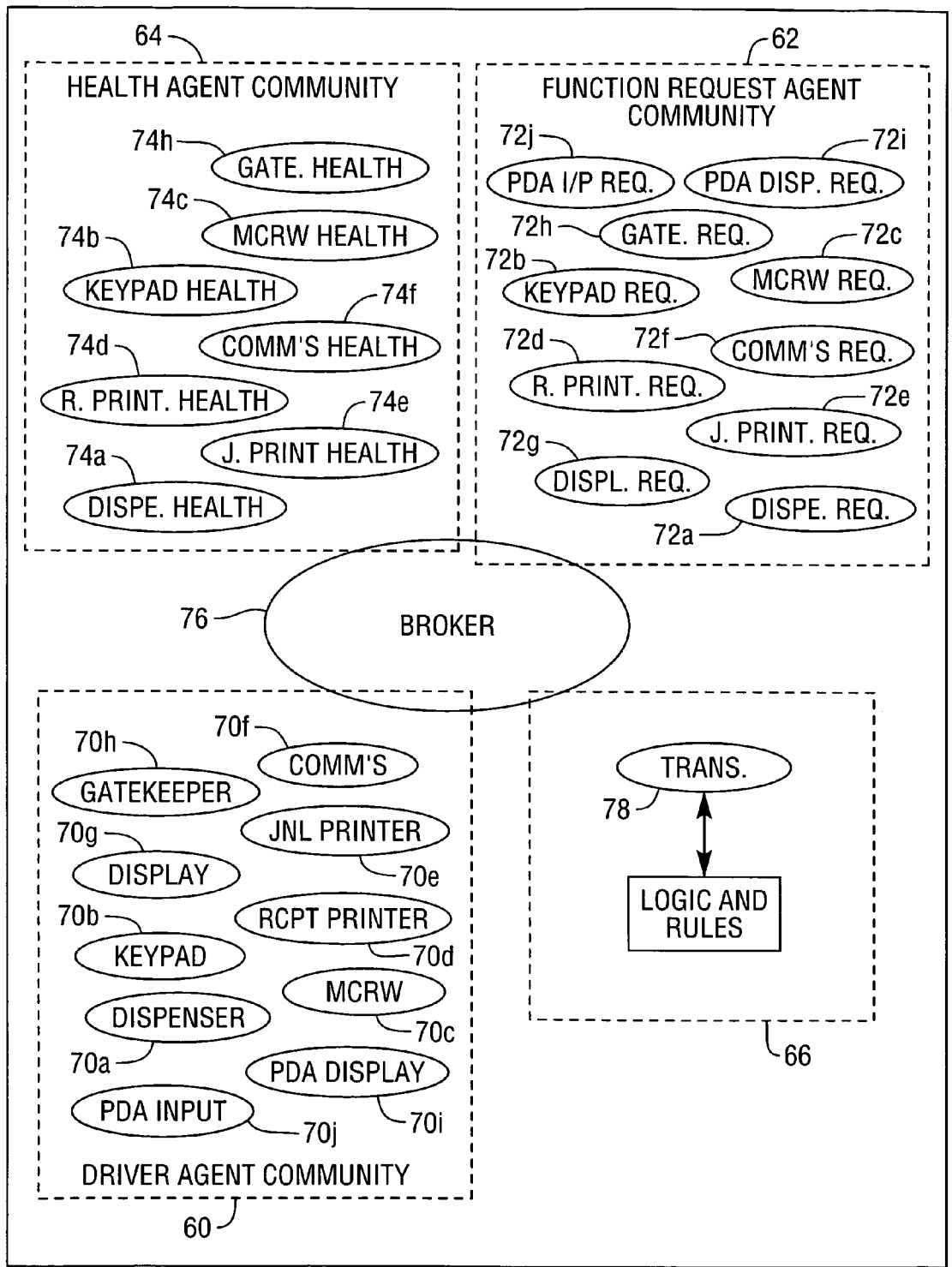
FIG. 2 is a schematic diagram showing the software architecture of a control application executing in memory of the terminal of FIG. 1.

Referring to FIG. 2, the agent environment 56 includes three agent communities: a driver agent community 60, a function request agent community 62, and a health agent community 64; and a logic engine 66.

Each community 60, 62, 64 contains agents that can interact with other agents within that community, and with associated agents in other communities. Each community 60, 62, 64 also contains an agent infrastructure to instantiate agents and to allow agents to execute.

The Driver Agent Community

The driver agent community 60 includes a driver agent 70 for each module in the ATM 10 (apart from the controller module 14), namely: a dispenser driver agent 70a, a keypad driver agent 70b, a card reader driver agent 70c, a receipt printer driver agent 70d, a journal printer driver agent 70e, a network card driver agent 70f, a display driver agent 70g, and a gatekeeper driver agent 70h for the wireless communications module 31. The driver agent community 60 also includes a small display agent 70i and a wireless input agent 70j for outputting information to and receiving information from a wireless device that may be used by an ATM user for entering a transaction at the ATM. The small display agent 70i renders information for viewing on a small display, such as a display incorporated into a cellular radio-frequency telephone (hereinafter a "cell phone"), a personal digital assistant (PDA), or such like. The wireless input agent 70j receives user entries from the cell phone or PDA. The gatekeeper driver agent 70h monitors information transmitted from a user's wireless device.

Each of these driver agents 70 translates generic commands to hardware-specific low-level commands for operating the associated module. Most of the drivers 70 also report status information from sensors or other indicators in their associated modules.

The driver agent community 60 accesses a broker agent 76 that performs administrative tasks, as will be described in more detail below. The broker agent 76 is not a driver agent 70 and is not part of the driver agent community 60, but the broker agent 76 is shown overlapping the community 60 in FIG. 2 because the broker agent 76 stores information about the driver agents.

The Function Request Agent Community

The function request agent community 62 includes a function request agent 72 for each module in the ATM 10 (apart from the controller module 14), namely: a dispenser function request agent 72a, a keypad function request agent 72b, a card reader function request agent 72c, a receipt printer function request agent 72d, a journal printer function request agent 72e, a network card function request agent 72f, a display function request agent 72g, and a gatekeeper function request agent 72h. The function request agent community 62 also includes a function request agent for outputting information to a wireless device, referred to as a small display function request agent 72i, and a function request agent for receiving information from a wireless device, referred to as a wireless input function request agent 72j.

The function request agent community 62 also accesses the broker agent 76. The broker agent 76 is not a function request agent 72 and is not part of the function request agent community 62, but the broker agent 76 is shown overlapping the community 62 in FIG. 2 because the broker agent 76 provides information to the function request agents 72.

Each of the function request agents 72 translates generic commands from the logic engine 66 to a format suitable for an associated driver agent 70, so that the function request agents 72 provide a consistent interface to the logic engine 66. An associated driver agent is a driver agent that provides suitable functions for the function request agent; for example, a dispenser driver agent is an associated driver agent for a dispenser function request agent.

The function request agents 72 also provide additional features for the logic engine 66 (for example, obtaining information from the driver agents 70 about the capabilities of the modules, the configuration of the modules, and such like).

The Health Agent Community

The health agent community 64 comprises a health agent 74 for each module in the ATM 10 (apart from the controller module 14 and the display module 20), namely: a dispenser health agent 74a, a keypad health agent 74b, a card reader health agent 74c, a receipt printer health agent 74d, a journal printer health agent 74e, a network card health agent 74f, and a gatekeeper health agent 74h.

Each health agent 74 collates and stores status information for its associated driver agent 72. The health agent community 64 also accesses the broker agent 76. The broker agent 76 is not a health agent 74 and is not part of the health agent community 64, but the broker agent 76 is shown overlapping the community 64 in FIG. 2 because the broker agent 76 provides information to the health agents 74.

A Health Agent

Figure 5:
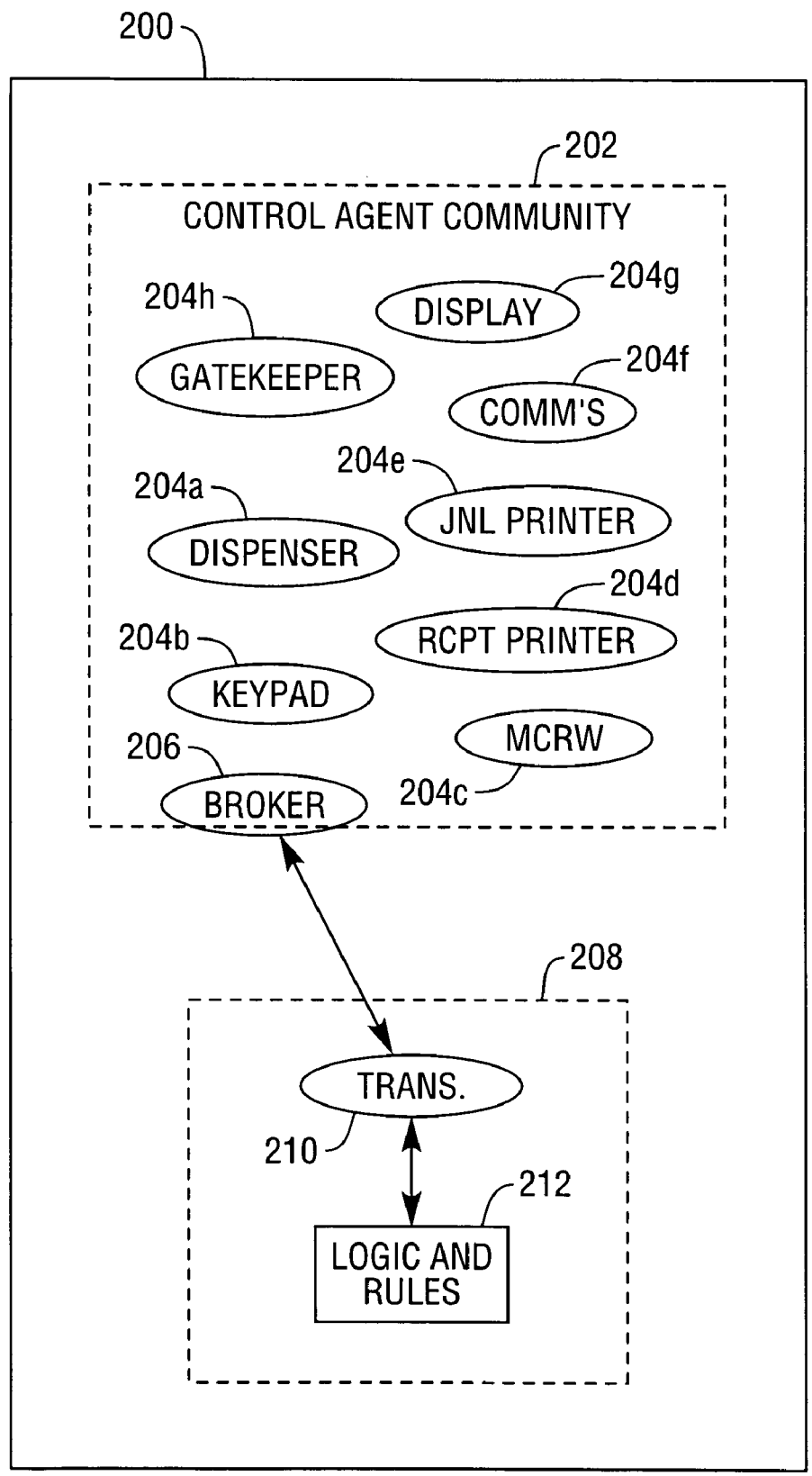
FIG. 5 is a schematic diagram of an alternative agent environment.

A typical health agent 74 is illustrated in FIG. 5. The agent 74 has an agent interface 110, an operation program 112, and a data storage area 114.

The agent 74 issues requests for information to, and receives responses and status information from, an associated driver agent 70 via the agent interface 110. The agent 74 also sends status information to an associated function request agent 72 via the agent interface 110.

The operation program 112 operates on the status information, for example, to predict faults and determine the operational status of the associated module.

Alternatively, SNMP traps can be utilized instead of the agent 74 issuing requests for information, as is known in the art.

The data storage area 114 stores status information and address information. The status information includes, for example, the state of sensors or other indicators within the module, previous faults, a log of status reports, and such like. The address information stores a contact identifier for the agent (that is, its own contact identifier) and contact identifiers of other agents it communicates with, namely, an associated driver agent 70 and an associated function request agent 72.

As mentioned briefly above, in known ATM health monitoring systems, each health agent operates in the background to monitor the functions of the modules. When a module, such as a cash dispenser, operates, sensors are activated in a sequence as notes are transported, shutters are opened and closed, diverter gates are activated, and such like. The dispenser health agent 74a monitors the operation of these sensors to predict possible failures and to inform a server (such as a replenisher or a technician) when media needs replenished or a reject bin needs emptied. This is analogous to fault prediction and management as is presently implemented by some ATMs.

If the dispenser health agent 74a detects that some service work needs to be performed, then the health agent 74a informs the dispenser function request agent 72a, which in turn requests the transaction and logic flow agent 78 to request via the network module 34 a service visit.

The agent environment 56 may include system agents that are not specific to one particular module, but monitor the health of the entire ATM 10 at the system level, and allow fault diagnosis and tests to be executed.

Figure 4:
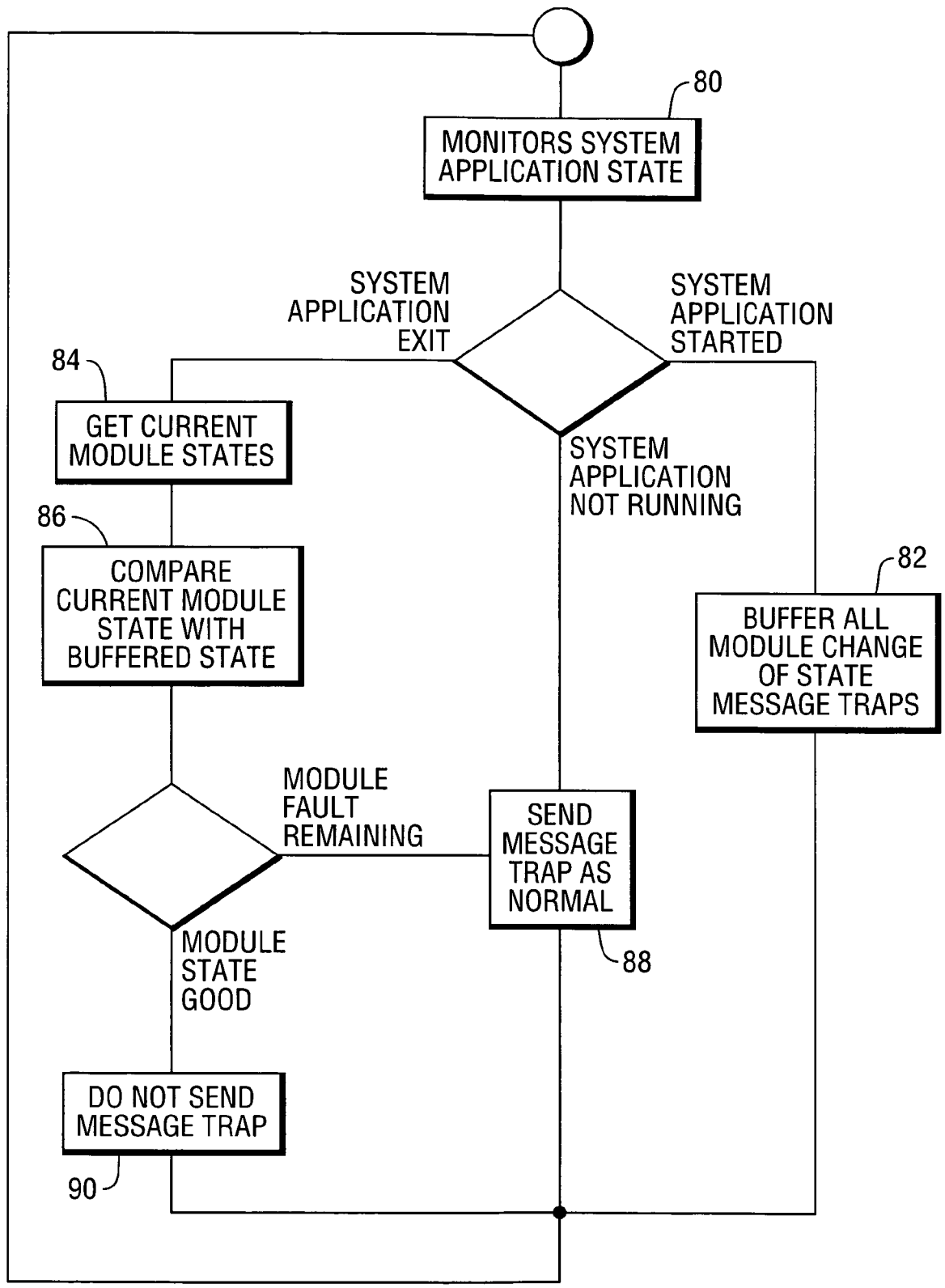
FIG. 4 is a flow diagram of the operation of an agent, in accordance with the present invention.

As illustrated in FIG. 4, in accordance with the present invention, the SNMP agent is modified to intelligently determine when the software application or service engineer has initiated a module only power down in, for example, in order to recover a failed module.

When a module only power down is detected, by the terminal being placed in a diagnostic mode by an engineer, then the SNMP agent will record and buffer the change of state messages but will not immediately send them up to the management system. The SNMP agent will wait for the devices to be powered back on, and the terminal to be taken out of the diagnostic mode into a normal operating mode, and will then determine what if any of the buffered state changes require to be sent up to the management system.

This operation can be explained most clearly with reference to the flow diagram, FIG. 4, in which the control or system application state is monitored to determine if the system application is in a normal operational or diagnostic state (box 80). Once the system is in a diagnostic state, if the application starts the shut down of a module then none of the health signals initiated by the agent are sent to the remote system state of health management server and instead they are buffered (box 82). The agent then monitors the activation of the module, and the return from diagnostic state to normal operational state and once the control application reactivates the module the agent again detects the state of health of the module (box 84) and compares it with the original state of health prior to power down of the module (box 86). If the new state of health of the module is good then no signal is sent to the remote server (box 88). However, if the state of health is still characteristic of a fault or problem with the module then the signal is sent to the remote server (box 90), whereupon appropriate action is instigated.

Alternative Embodiment

An alternative embodiment of the present invention will now be described with reference to FIG. 5, which shows an agent environment 200. The agent environment 200 is implemented on the same hardware (that is, the ATM modules) as the above embodiment.

The agent environment 200 has a module control agent community 202 comprising a module control agent 204 for each module in the ATM.

The environment also has a control agent broker 206 and a logic engine 208. The logic engine 208 comprises a transaction flow agent 210 and a rules and business logic file 212.

In this embodiment, each control agent 204 combines the functions of a driver agent, a function request agent and a health agent, from the previous embodiment.

The transaction flow agent 210 operates in a similar manner to the transaction flow agent in the first embodiment.

Various modifications may be made to the above described embodiments within the scope of the invention. For example, instead of detecting the state of the terminal (normal operation or diagnostic mode) sensors on the module may detect if a loss of power at a terminal is a power down by an engineer or the control system or an erroneous loss of power, in much the same way that a pc can determine if a loss of power is intentional.

The invention claimed is:

1. A self-service terminal comprising a pc core and at least one module, which can be powered down independently of the pc core; the terminal having a control application and an agent arranged to monitor the fault state of the at least one module and cause a fault signal to be sent from the terminal when the fault state of the at least one module is characteristic of a problem with the at least one module, wherein the agent is arranged to determine if the module has been powered down, whereupon the fault signal is buffered until the module is powered up and a determination as to the fault state of the module is again made and the fault signal is only sent if the fault state is still characteristic of a problem with the at least one module.

2. A terminal according to claim 1, wherein there is a plurality of modules and each module has an associated agent.

3. A terminal according to claim 1, wherein the agent is an SNMP agent.

4. A terminal according to claim 1, wherein the at least one module is selected from: a display module, a keypad module, a card reader module, a cash dispenser module, a statement printer module; a controller module, a communications module and a journal printer module.

5. A terminal according to claim 1, wherein the fault signal is arranged for detection and decoding by a remote state of health monitoring facility.

6. A terminal according to claim 1, wherein the self-service terminal is an automated teller machine (ATM).

7. A terminal according to claim 1, wherein the that the control application comprises a plurality of module driver agents, a plurality of module function request agents for requesting functions provided by a module, the module driver agents being operable to co-operate with an associated function request agent to provide module functions.

8. A terminal according to claim 7, wherein the driver agents are organized in a community of agents.

9. A terminal according to claim 3, wherein the at least one SNMP agent is an SNMP trap.

10. A terminal according to claim 1, wherein the agent is arranged to determine if the at least one module has been powered down by ascertaining when the terminal is placed in a diagnostic mode; loss of power to the at least one module being classified as a power down when the terminal is in said diagnostic mode.

11. A method of operating a self-service terminal self-service terminal comprising a pc core and at least one module, which can be powered down independently of the pc core; the terminal having a control application and an agent arranged to monitor the fault state of the at least one module and cause a fault signal to be sent from the self-service terminal when the fault state of the at least one module is characteristic of a problem with the at least one module; the method including:
 determining if the module has been powered down;
 if the module has been powered down buffering the fault signal
 powering up the module; and
 determining the fault state of the module again; and
 sending a fault signal only if the fault state is still characteristic of a problem with the at least one module.

12. A method according to claim 11, wherein the agent is an SNMP agent.

13. A method according to claim 12, wherein the at least one SNMP agent is an SNMP trap.

14. A method according to claim 11, wherein the fault signal is arranged for detection and decoding by a remote state of health monitoring facility.

15. A method according to claim 11, wherein the agent is arranged to determine if the at least one module has been powered down by ascertaining when the terminal is placed in a diagnostic mode; loss of power to the at least one module being classified as a power down when the terminal is in said diagnostic mode.

* * * * *